United States Patent [19]

Phillips et al.

[11] Patent Number: 4,611,395
[45] Date of Patent: Sep. 16, 1986

[54] FILLING SYSTEM FOR HERMETICALLY SEALED BATTERIES

[75] Inventors: Gary M. Phillips, Vadnis Heights; Albert S. Benjamin, White Bear Lake, both of Minn.

[73] Assignee: Medtronic, Inc., Minneapolis, Minn.

[21] Appl. No.: 730,568

[22] Filed: May 6, 1985

Related U.S. Application Data

[62] Division of Ser. No. 579,787, Feb. 13, 1984, Pat. No. 4,542,080.

[51] Int. Cl.[4] .......................................... H01M 6/00
[52] U.S. Cl. .................................... 29/623.2; 429/72; 429/80; 429/118; 429/185; 137/156; 137/169
[58] Field of Search ...................... 429/72, 73, 80, 118, 429/174, 185; 29/623.2; 137/156, 169, 625.42

[56] References Cited

U.S. PATENT DOCUMENTS

| 2,812,860 | 11/1957 | Dilworth | 137/156 X |
| 3,867,201 | 2/1975 | Holmes | 429/118 |
| 3,945,846 | 3/1976 | Dey | 429/72 X |
| 4,006,281 | 2/1977 | Markin et al. | 429/52 X |
| 4,132,836 | 1/1979 | Greatbatch | 429/91 |
| 4,360,573 | 11/1982 | Rao et al. | 429/72 |

Primary Examiner—Brian E. Hearn
Assistant Examiner—Stephen J. Kalafut
Attorney, Agent, or Firm—Vidas & Arrett

[57] ABSTRACT

Electrochemical cell containers having an improved seal arrangement including a polymeric member carrying a metal pin in a base extending therethrough.

3 Claims, 3 Drawing Figures

FILLING SYSTEM FOR HERMETICALLY SEALED BATTERIES

This is a division of application Ser. No. 579,787, filed Feb. 13, 1984, now U.S. Pat. No. 4,542,080.

BACKGROUND OF PRIOR ART

This invention relates to electrochemical cells of improved construction. Specifically it is concerned with cells having an improved seal in the filler opening of the cell container for the introduction of a fluid cell component or components into the container.

With the advent of high energy density nonaqueous cells generally utilizing fluid components such as thionyl chloride and sulfur dioxide depolarizers and various reactive organic electrolyte solvents, the design and sealing of the filler opening of such cells has become increasingly important. For purposes of this invention, the term "fluid" is meant to describe any component capable of flowing into the cell container. In most instances, the component will be a liquid, including solutions.

Electrochemical cells such as rechargeable lithium cells having a liquid electrolyte and incorporating various components may make use of the invention. For example, see U.S. Pat. No. 4,118,550 and U.S. Pat. No. 3,998,658 for cells of this type. The following listed U.S. patents show various lithium-halogen batteries or cells of another type making use of cell containers in which a fluid component is introduced into the container though a filler opening: U.S. Pat. Nos. 4,105,833; 4,135,519; 4,132,836; 4,166,887; 4,211,832 and 4,360,573. These cells may also make use of this invention. All of these patents are incorporated herein by reference.

It should be understood that, if a fluid component is used in accordance with this invention, it need be in fluid form only at the time of its introduction into the cell container. Thereafter, it may solidify or assume any other form as required by the particular cell involved.

BRIEF SUMMARY OF THE INVENTION

This invention provides an improvement in electrochemical cell construction wherein the cell container filler opening includes a unique arrangement for filling and sealing the cell.

DETAILED DESCRIPTION OF THE INVENTION

Figure 1:
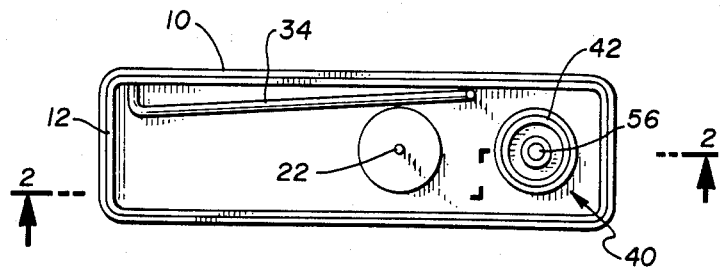
FIG. 1 is a top elevational view of an electrochemical cell illustrating the improved construction of the invention.
Figure 2:
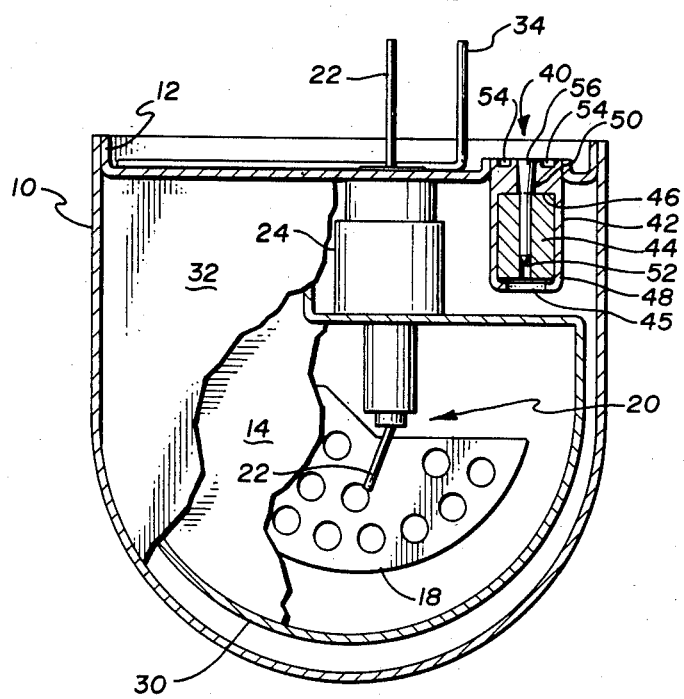
FIG. 2 is a side elevational view in section along line 2—2 of FIG. 1 with parts of the cell removed to show the invention in more detail.

Referring now to FIGS. 1 and 2, a hermetically sealed cell is illustrated showing the preferred form of the fill/seal arrangement of the invention. The cell comprises a container 10 of metal such as stainless steel. Container 10 has an open top or end which is closed by means of a lid 12, also of stainless steel. Lid 12 is welded to container 10. The cell also includes anode means, in this case comprising a lithium element 14 and an embedded anode current collector element 18. Current collector 18 is a relatively thin element of metal such as stainless steel, nickel or zirconium. A conductor lead feedthrough assembly 20 including lead 22 of stainless steel or other suitable metal is spot welded to collector element 18. Electrical lead 22 is of sufficient length to extend out of the container 10 for the purpose of making an external electrical connection thereto. Conductor 22 and the related feedthrough assembly 20 are sealed from the remainder of the cell contents internally by means including a protective sheath element generally designated 24 which surrounds the feedthrough assembly internally. Sheath element 24 is of a material which, in addition to being a non-conductor of electricity is also non-reactive with the contents of the cell. Materials found to perform satisfactorily for this purpose are the fluoropolymers, such as the one available under the Tradename "Halar", a trademark of the Allied Chemical Company. Other nonreactive electrical insulating materials may be used for element 24 as well.

The anode assembly comprising the lithium element 14, for example, and current collector 18 is preferably fitted within a separator enclosure 30 which separates the anode from the electrolyte and the cathode means. Separator 30 is preferably of polypropylene or polyethylene or other microporous polymeric material which allows ionic conduction therethrough but prevents electron transport. A preferred arrangment for such a separator is shown in co-pending application Ser. No. 553,582, filed Nov. 21, 1983, incorporated herein by reference.

The anode assembly is positioned in container 10 as shown in FIG. 2 with all the anode surfaces spaced from the inner surface of the container so as to guard against contact between the anode and the container. Likewise, a pair of carbon or other suitable cathodes 32 may be positioned to each side of the anode assembly and included in the container so as to electrically contact the inside wall thereof. Preferred cathodes of the carbon type are described more fully, for example, in U.S. Pat. No. 4,118,550 entitled Aprotic Solvent Electrolyte Batteries, issued Dec. 21, 1976. These patents are incorporated herein by reference.

In the particular embodiment illustrated, container 10 being of electrically conducting material serves as a cathode current collector in direct contact with the cathodes 32 in container 10. Consequently, an electrical lead 34 may be attached directly to container 10 for cathodic contact and connection.

In accordance with the present invention a fill port seal arrangement plug construction is generally indicated at 40. Subassembly 40 includes a metal sleeve 42, of stainless steel or the like which includes a polymeric plug 44 having a passageway or bore extending therethrough. Plug 44 is preferably positioned at an inner location as shown in FIG. 2. Plug 44 is made of a compressible body of a suitable non-reactive polymeric material (to the system involved) such as polytetrafluoroethylene (PTFE) or other suitable fluoropolymer. Typically, polypropylene, polyethylene and other such polymeric materials which are non-reactive to the system may be used.

Sleeve 42 is welded into an opening in lid 12 as shown. Plug 44 may be molded into sleeve 42 or it may be preformed and inserted into the sleeve as shown. In such an arrangement, the sleeve will include an inner annular shoulder 46 against which plug 44 rests. The bottom of sleeve 44 is open as at 45 and is crimped or otherwise formed as shown at 48 so as to retain plug 44 therein. Any other means suitable for retaining the plug in the sleeve may be used.

As can be seen in the drawing, an upper opening 50 in sleeve 42 leads to a relatively small opening or bore 52 in plug 44 which in turn leads to the interior of container 10. This opening may be formed in the plug or predrilled or formed by any suitable means.

With such a plug in place as shown in the drawing, a hypodermic-like needle or other suitable conduit may be inserted through plug 44. By means of such an arrangement, container 10 may be evacuated and then filled with any fluid component or components of the cell, such as the aforementioned fluid electrolyte material.

Following the filling of container 10 by means of penetration and removal of the needle or the like from plug 44, a metal plug member 56 is inserted into sleeve 42 by force-fit. Preferably, the top thereof is welded into position as shown at 54.

Figure 3:
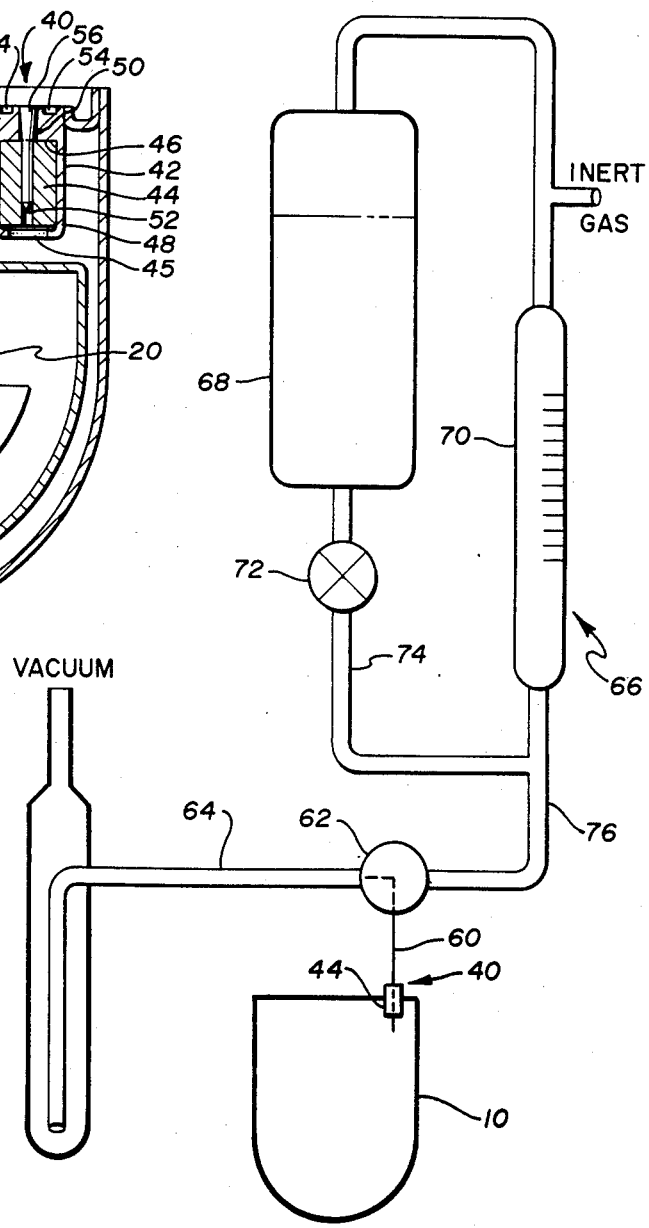
FIG. 3 is a schematic arrangement for effecting the filling of a cell constructed according to the invention.

Filling of the cell is preferably accomplished by using an arrangement of the type shown in FIG. 3. This arrangement includes a hollow needle 60 which is shown schematically and which is inserted through the bore of plug 44 in fill port 40 and into the interior of cell container 10. Evacuation and filling is accomplished through this needle. The exterior end of needle 60 is connected to a 3-way valve 62.

In one position (shown), valve 62 interconnects needle 60 to vacuum line 64 which is connected to a source of vacuum as indicated in the drawing.

In a second position (not shown), valve 62 interconnects needle 60 to a fluid fill source means generally indicated at 66. Fill source means 66 includes a reservoir 68 which contains an amount of a fluid of the type to be included in cell 10. Quantities of the fluid may be passed to a measuring container 70 through a valve 72 and conduit 74. A source of inert gas may be provided as shown to provide a protective blanket over the fluid in reservoir 68 and container 70.

Once evacuation of cell container 10 has been accomplished, a quantity of fluid, which has been passed to container 70 by means of an opened valve 72 and conduit 74, can be allowed to flow into the cell container by closing valve 72 and by placing valve 62 in its second position thereby establishing flow connection between container 70 and cell container 10 by means of conduit 76.

Upon completion of the filling of cell container 10 a prescribed level or quantity, the needle is removed and the cell is then sealed as described hereinabove.

While a preferred embodiment has been described in detail, this has not been done for purposes of limitation but for illustration. It is to be understood that various changes may be made in the form, construction and arrangement of the several elements, parts and components described and the various material used without departing from the spirit and scope of the invention. Hence, there is no intent to be limited to the details shown or described herein except as the same are included in the claims or may be required by disclosures of the prior art.

What is claimed is:

1. A method of introducing a fluid component into a cell container, comprising:

providing a filler opening having a polymeric body positioned therein, the body having a relatively small diameter opening extending therethrough and leading into the container interior;

introducing a tight fitting needle-like conduit through the opening in the polymeric body and into the container interior;

exerting a vacuum on the conduit to substantially evacuate the container;

connecting a supply of the fluid component to the conduit and allowing the vacuum established in the container to draw a predetermined amount thereof into the container;

removing the needle-like conduit from the polymeric body;

force-fitting a metal insert into the opening in the polymeric body to seal it closed, and attaching the outer portion of the metal insert to the container to fix it in its sealing position in the polymeric body.

2. The method of claim 1 wherein:

a three-way valve is connected to the conduit for alternately connecting the conduit to a vacuum source and to the fluid supply;

the fluid supply comprises a measuring container for the fluid component and a standpipe reservoir connected thereto for providing measured amounts of the fluid component to the measuring container, and a valve is included between the standpipe reservoir and the measuring container for controlling the flow of fluid component into the measuring container.

3. The method of claim 2 wherein an inert gas is supplied to the standpipe reservoir and the measuring container to blanket the fluid component therein.

* * * * *